(12) United States Patent
Kawai et al.

(10) Patent No.: US 7,319,201 B2
(45) Date of Patent: Jan. 15, 2008

(54) WATERPROOF/DUSTPROOF STRUCTURE

(75) Inventors: Tomohiko Kawai, Yamanashi (JP);
Kenzo Ebihara, Yamanashi (JP);
Hiroshi Minami, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/385,862

(22) Filed: Mar. 22, 2006

(65) Prior Publication Data
US 2006/0226609 A1    Oct. 12, 2006

(30) Foreign Application Priority Data
Mar. 24, 2005    (JP) .............................. 2005-086603

(51) Int. Cl.
*H01H 9/04* (2006.01)
(52) U.S. Cl. .................................................. 200/302.1
(58) Field of Classification Search ............. 200/302.1, 200/302.2
See application file for complete search history.

(56) References Cited

U.S. PATENT DOCUMENTS

| | | | |
|---|---|---|---|
| 2,366,911 A * | 1/1945 | Laird ......................... | 220/225 |
| 3,167,894 A | 2/1965 | Seidel | |
| 3,434,706 A | 3/1969 | Roder | |
| 5,471,022 A * | 11/1995 | Kiss et al. ................. | 200/83 B |
| 5,575,380 A * | 11/1996 | Imai ........................ | 200/302.2 |
| 5,959,271 A * | 9/1999 | Matsuhashi .............. | 200/61.41 |

FOREIGN PATENT DOCUMENTS

| | | |
|---|---|---|
| CN | 1131402 | 9/1996 |
| DE | 1 652 083 | 10/1967 |
| JP | 2004-286109 | 10/2004 |

OTHER PUBLICATIONS

European Search Report in corresponding Patent Application No. 06251203.3-2302.
Chinese Patent Office Action, mailed Jul. 7, 2007 and issued in corresponding Chinese Patent Application No. 2006100659090.

* cited by examiner

*Primary Examiner*—K. Richard Lee
(74) *Attorney, Agent, or Firm*—Staas & Halsey LLP

(57) ABSTRACT

A simple, inexpensive waterproof/dustproof structure for a movable mechanism such as a machine tool apparatus or the like, providing a liquid reservoir formed between the inner wall of a stationary member and the outer wall of a movable member at a portion equivalent to the entrance of a gap between the stationary member and the movable member. The leading edge of the movable member moves through a liquid LQ that fills the liquid reservoir. The liquid LQ seals off the interior of the apparatus from the exterior to prevent the entry of mist, dust and other foreign matter. The gap may be made comparatively broad without affecting the ability to prevent the entry of foreign matter. The direction of movement of the movable member may be longitudinal, lateral, reciprocal, rotary, or a combination thereof, depending on the type of movable mechanism to which the waterproof/dustproof structure is applied. The liquid LQ may be a working fluid used by a hydraulic bearing or a machining fluid used by a machine tool.

3 Claims, 3 Drawing Sheets

WATERPROOF/DUSTPROOF STRUCTURE

BACKGROUND OF THE INVENTION

1. Field of the Invention

The present invention relates to a waterproof/dustproof structure for an apparatus having a mechanism composed of a stationary member and a movable member. The waterproof/dustproof structure is applicable to an apparatus such as a machine tool having a movable member whose movement is required to be precise.

2. Description of Related Art

In a mechanism having a movable member whose movement is required to be precise, for example the movable member of a machine tool, in order not to impede the movement of the movable member it is desirable not to have the stationary member and the movable member in fixed contact with each other. However, not having the stationary member and the movable member in fixed contact with each other means that a gap exists between the two members, which in turn necessitates preventing fluid and particles from entering the interior of the machine tool or other apparatus through that gap.

As a waterproof/dustproof structure effective in preventing the entry of fluids and particles into the interior of the apparatus through this sort of gap between the stationary member and the movable member, forming a labyrinth of minute vacant spaces in the gap formed between a fixed member and a movable member that are not in fixed contact with each other is known conventionally.

FIG. 1 is a diagram showing a cross-sectional view of a labyrinth according to the conventional art. In FIG. 1, reference numerals 1 and 2 designate the stationary member and the movable member, respectively, with a gap 3 formed between the two members. Typically, the direction of movement of the movable member 2 with respect to the stationary member 1 is either (1) horizontally, perpendicular to the surface of the paper, or (2) vertically, within the plane of the drawing. In general, however, the direction of movement is such as to hold the gap 3 constant, and depending on the mechanism to which it is applied, the direction of movement can also be a combination of (1) and (2), (that is, a slanting vertical direction).

In such a labyrinth, the gap 3 between the stationary member 1 and the movable member 2 is slight, and further, since contact between the members is not permitted, the respective members (or parts that comprise the members) are required to be formed with a high degree of precision, and moreover, they must also be assembled with great precision. These requirements are disadvantageous because they increase the cost of the members and parts and because they increase the number of assembly steps. In addition, although the labyrinth forms the boundary between the interior and the exterior of the apparatus (for example, a machine tool) having a movable mechanism, despite its narrowness, it still constitutes a path by which foreign matter crosses that boundary from the outside of the apparatus (the surrounding environment) to the inside of the apparatus.

As a result, as shown in the drawing, with long use comes the possibility of particles of dust or the like and water particle mist and so forth getting inside the apparatus and contaminating the interior of the apparatus. In addition, particles and mist components sometimes adhere to the inner walls of the narrow gap 3 and can obstruct the smooth movement of the movable member 2.

As a common technique for preventing the entry of foreign matter through the gap between the two members there is a method involving the use of an air curtain-like air flow (see, for example, JP 2004-286109A). However, a problem with this method is that the mechanism that forms the air flow is complicated.

SUMMARY OF THE INVENTION

The present invention provides a simple waterproof/dustproof structure to solve the above problems of the conventional art attendant upon the existence of a gap between a stationary member and a movable member.

A waterproof/dustproof structure of the present invention is provided for a boundary between an interior and an exterior of an apparatus. The waterproof/dustproof structure comprises: a stationary member; a movable member that moves without contact with the stationary member forming a gap region in between to define the boundary between the interior and the exterior of the apparatus; and a liquid reservoir containing liquid in the gap region to shield the interior of the apparatus from the exterior.

The movable member may be supported by a hydraulic bearing. In this case, hydraulic fluid of the hydraulic bearing may be utilized as the liquid.

The apparatus to be subjected to waterproof/dustproof may comprise a machine tool. In this case, machining fluid used in the machine tool may be utilized as the liquid.

The invention has the following advantages:

(1) Although with the conventional labyrinth it is possible for particles and liquid in the form of mist to enter the interior of the apparatus through the slight gap therein, the waterproof/dustproof structure of the present invention completely seals off the interior of the apparatus with liquid and thus shuts down the path of entry of foreign matter, thereby eliminating the risk of entry. Furthermore, since the waterproof/dustproof structure can be provided without fixed contact between the stationary member and the movable member, such structure does not obstruct precise movement of the movable member.

(2) The waterproof/dustproof structure of the invention does not require that the gap between the stationary member and the movable member be especially narrow, and thus both members or their constituent parts can be formed and assembled with even less rigorous precision than that required by the conventional labyrinth, which provides a cost advantage.

(3) The liquid used in the waterproof/dustproof structure of the invention for closing off the interior of the apparatus does not need to have special qualities, and thus does not contribute to an increase in cost. For example, where the movable member is supported by a hydraulic bearing, the working fluid of that hydraulic bearing may be used as the liquid of the waterproof/dustproof structure. Similarly, where the apparatus is a machine tool, the machining fluid may be used as the liquid of the waterproof/dustproof structure.

(4) The waterproof/dustproof structure of the invention has only to hold the liquid used for closing off the interior, and therefore there is no need for special flow paths or circulation equipment, which also provides a cost advantage.

DETAILED DESCRIPTION

A detailed description will now be given of preferred embodiments of the present invention, with reference to the drawings.

Figure 1:
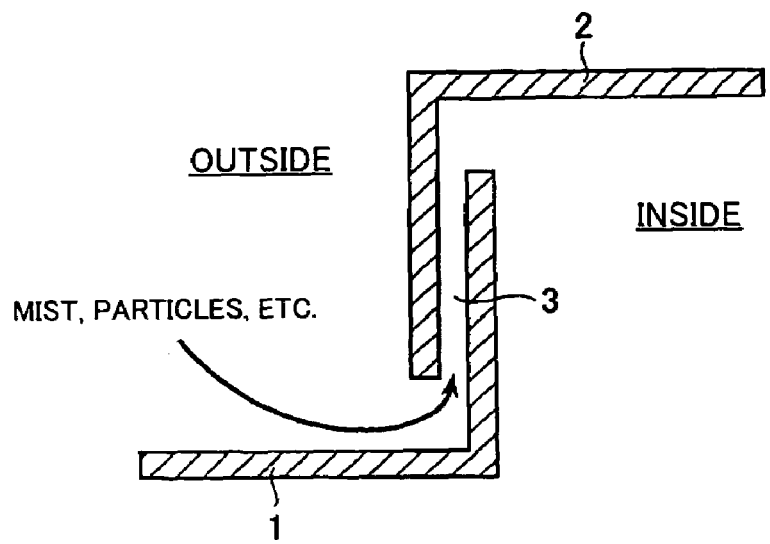
FIG. 1 is a diagram showing a cross-sectional view of a labyrinth according to the conventional art.
Figure 2:
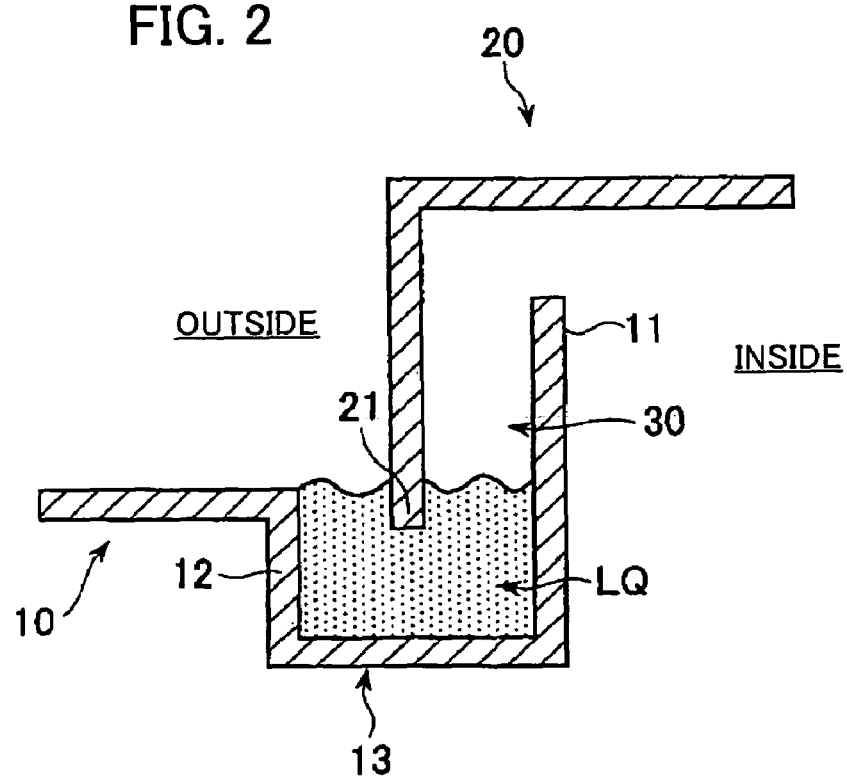
FIG. 2 is a diagram showing a cross-sectional view of the basic structure of a waterproof/dustproof structure according to the present invention.

First, a description is given of the basic structure of the waterproof/dustproof structure of the present invention with reference to FIG. 2. FIG. 2 shows the basic structure of the waterproof/dustproof structure according to the present invention in a form that enables comparison with the conventional labyrinth shown in FIG. 1. The requisite structure, in which reference numerals 10 and 20 denote the stationary member and the movable member, respectively, with a gap 30 formed between both members, is the same as in the conventional art. However, unlike the conventional structure shown in FIG. 1, a liquid reservoir 13 formed between the inner wall 11 and the outer wall 12 of the stationary member 10 is provided at what corresponds to the entrance of the gap 30 as seen from outside the apparatus, and the liquid reservoir 13 is filled with a liquid LQ.

The depth of the liquid reservoir 13 is designed so that, when the liquid reservoir 13 is filled with liquid LQ, the leading edge 21 of the movable member 20 moves while immersed in the liquid LQ. Therefore, the liquid LQ that the liquid reservoir 13 holds fulfills the function of a lid that covers what corresponds to the entrance of the gap 30 as seen from outside the apparatus. Through this covering function, the area inside the apparatus is closed off from the outside, preventing mist, dust and other foreign matter from entering.

In addition, whereas the conventional structure (see FIG. 1) must be extremely narrow in order to prevent the entry of foreign matter, in the structure according to the present invention, because the entrance by which foreign matter might enter is closed by the liquid LQ, the gap 30 can be comparatively broad without adversely affecting the ability of the structure to prevent the entry of foreign matter. The ability to widen the gap 30 between the stationary member 10 and the movable member 20 means that the precision with which both members 10, 20 (or the parts that form these members) are required to be formed may be reduced, and the requirement that they be assembled with precision may be relaxed as well.

Therefore, with the structure described above, the cost of manufacture of the members or the parts, as well as the number of assembly steps required for their assemble, can be reduced, which provides advantages in both areas. It should be noted that the leading edge 21 of the movable member 20 moves while immersed in the liquid LQ, and thus a slight amount of resistance arises, but, since the body is a liquid and not a solid, it does not substantially hinder the smooth movement of the movable member 20. In addition, although it might be thought that, depending on the direction and speed of movement of the movable member 20, the movement of the movable member 20 might cause ripples to form in the liquid LQ. In that case, the leading edge 21 of the movable member 20 can be thinned or tapered as necessary. The liquid used to seal off the interior of the apparatus is not required to be special, and thus, if the movable member 20 is supported by a hydraulic bearing that uses a liquid as its working fluid, that working fluid may be used as the liquid. In addition, if the apparatus is a machine tool, the machining fluid used in machining (that is, the fluid that is supplied to the vicinity of the point of machining by the machine tool) may be used as the liquid.

The foregoing arrangement also relaxes the permissible conditions governing the direction of movement of the movable member 20, enabling the present invention to be adapted not only to a case in which the movable member 20 moves (1) horizontally, perpendicular to the surface of the paper, (2) vertically, within the plane of the drawing or a combination of (1) and (2), (that is, a slanting vertical direction) so as to hold the gap 30 constant, but also to a case in which the gap 30 changes during operation.

Figure 3A:
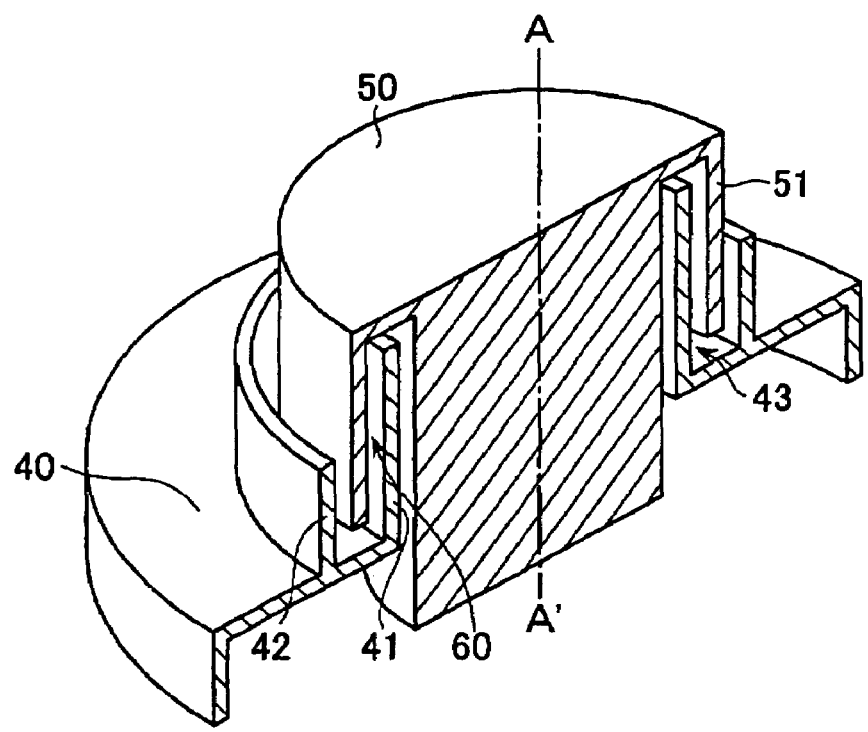
FIGS. 3A and 3B are diagrams of examples of the waterproof/dustproof structure according to the present invention applied to a rotary shaft mechanism, showing a perspective sectional view along the rotary shaft and a vertical sectional view along the rotary shaft, respectively.
Figure 3B:
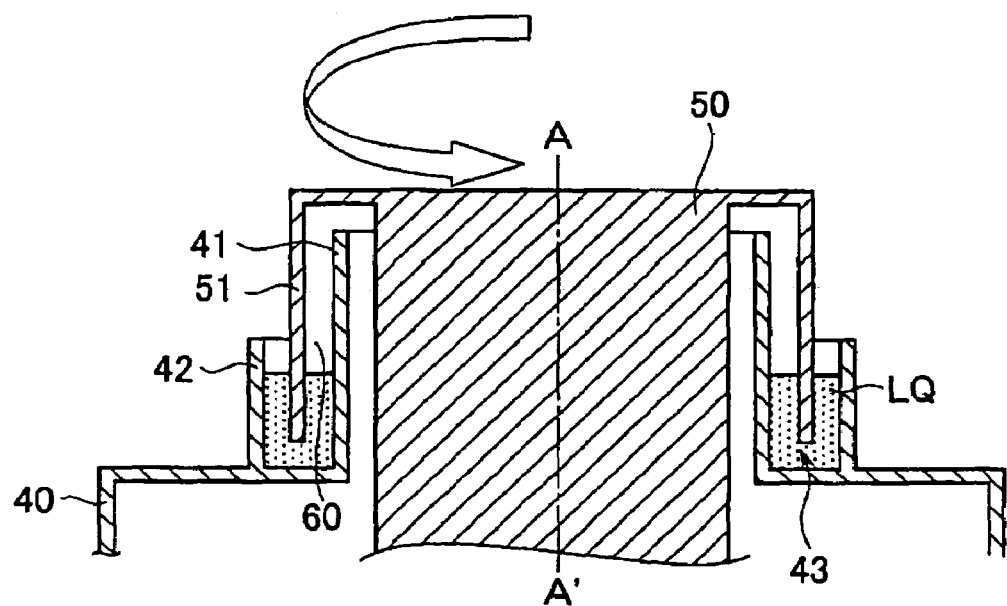

FIGS. 3A and 3B are diagrams of examples of the waterproof/dustproof structure according to the present invention applied to a rotary shaft mechanism, showing a perspective sectional view along the rotary shaft and a vertical sectional view along the rotary shaft, respectively. In this case, the movable member is a rotary shaft member 50 supported so as to rotate freely about an axis of rotation A-A' shown in the diagrams. It should be noted that the bearing mechanism that rotatably supports the rotary shaft member 50 is not shown in the diagrams, but may be provided below the portion shown in the diagrams, for example.

The rotary shaft member 50 has a downwardly pendant part 51 that extends around the entire outer circumference thereof, approximately the lower half of which is inserted between an inner wall part 41 and an outer wall part 42 of a stationary member 40. Therefore, a gap 60 is formed between the inner wall 41 of the stationary member 40 and the downwardly pendant part 51 of the movable member 50 that is the equivalent of the gap 30 in the basic form described above. A liquid reservoir 43 formed by the bottom edges of the inner wall part 41 and the outer wall part 42 is provided at a portion that corresponds to the entrance to the gap 60 when viewed from the exterior of the apparatus, with a liquid LQ held in the liquid reservoir 43.

In the present example, the depth of the liquid reservoir 43 is determined by the height of the outer wall part 42. If, for example, the liquid reservoir 43 is filled to the brim with the liquid LQ, then that portion of the rotary shaft member 50 extending from the bottom edge to the surface of the liquid LQ rotates about the axis of rotation A-A while submersed in the liquid LQ. Therefore, the liquid LQ that the liquid reservoir 43 holds performs the function of a lid that covers the portion that corresponds to the entrance to the gap 60 when viewed from the exterior of the apparatus, thus sealing off the interior of the apparatus from the exterior so as to prevent the entry of mist, dust and other such foreign matter into the interior of the apparatus.

Moreover, because the liquid LQ covers the entrance by which foreign matter might get inside the apparatus, the gap 60 can be comparatively broad without adversely affecting the ability of the structure to prevent the entry of foreign matter. The same holds true for the gap between the outer wall part 42 and the inner wall part 41, which need not be made particularly narrow. In addition, the precision with which both members 40, 50 (or the parts that form these members) are required to be formed may be reduced, and the requirement that they be assembled with precision may be relaxed as well. As a result, the waterproof/dustproof structure of the invention provides advantages both in terms of the cost of manufacturing the members or the parts and in the number of steps required for assembly. It should be noted that, in the present example, since a part of the downwardly pendant part 51 of the rotary shaft member 50 rotates without fixed contact at a constant radius while immersed in the liquid LQ, virtually no waves are caused and the smooth movement of the rotary shaft member 50 is substantially not obstructed.

Figure 4A:
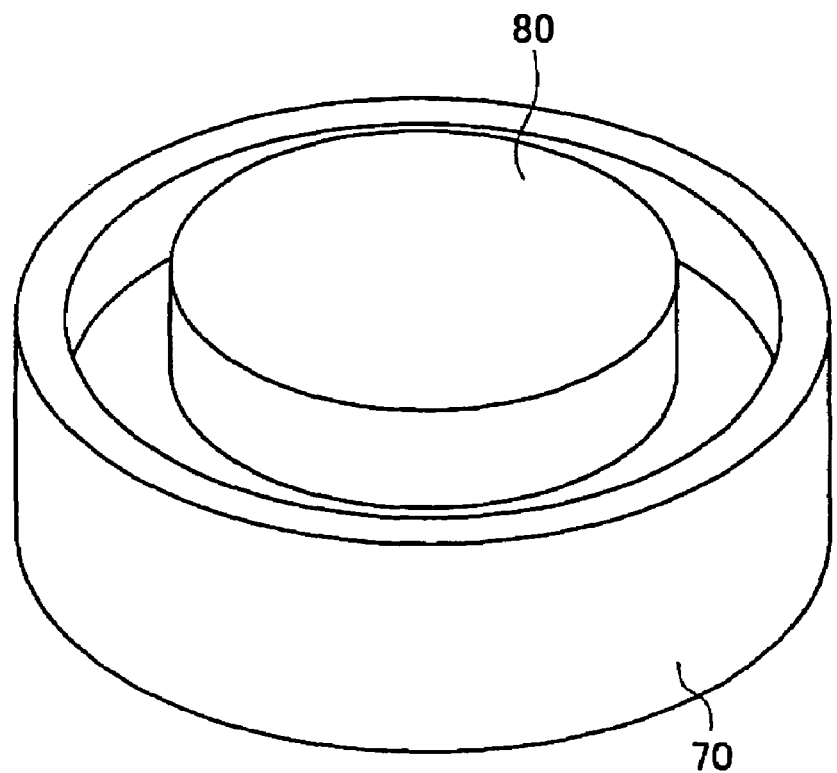
FIGS. 4A and 4B are diagrams of examples of the waterproof/dustproof structure of the present invention applied to a movable mechanism having a large degree of movement direction freedom, showing a simplified perspective view and a vertical sectional view, respectively.
Figure 4B:
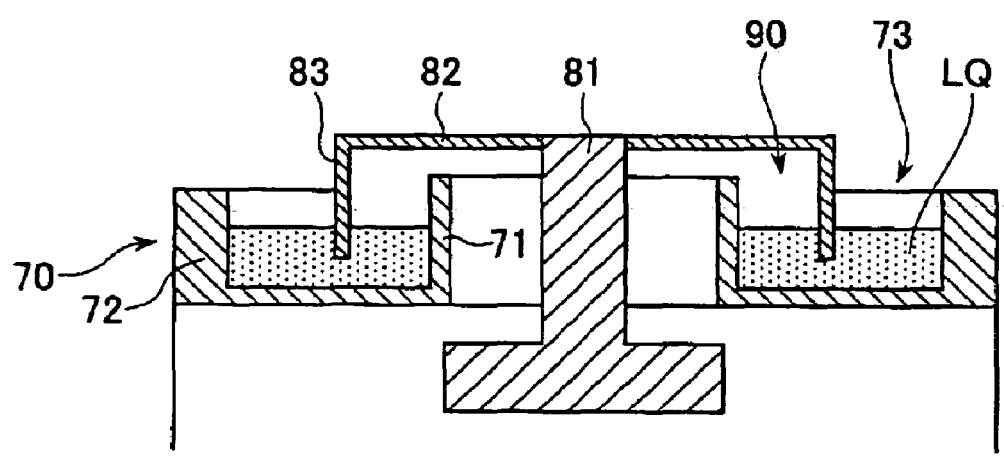

FIGS. 4A and 4B are diagrams of examples of the waterproof/dustproof structure of the present invention applied to a movable mechanism having a large degree of movement direction freedom, showing a simplified perspective view and a vertical sectional view, respectively. In the present example, the movable member is a floating-type movable member 80 capable of moving longitudinally, laterally, or in rotation. The movable member 80 comprises a columnar part 81 that extends into the interior of the apparatus, a roof part 82, and a downwardly pendant part 83 that extends around the entire outer circumference of the roof part 82, with approximately the lower half of the downwardly pendant part 83 inserted between an inner wall part 71 and an outer wall part 72 of a stationary member 70. Therefore, a gap 90 is formed between the inner wall 71 of the stationary member 70 and the downwardly pendant part 83 of the movable member 80 that is the equivalent of the gap 30 in the basic form described above.

A liquid reservoir 73 formed by the bottom edges of the inner wall part 71 and the outer wall part 72 is provided at a portion that corresponds to the entrance to the gap 90 when viewed from the exterior of the apparatus, with a liquid LQ held in the liquid reservoir 73. In the present example, the depth of the liquid reservoir 73 is determined by the height of the outer wall part 72. If, for example, the liquid reservoir 73 is filled to the brim with the liquid LQ, then that portion of the movable member 80 extending from the bottom edge to the surface of the liquid LQ moves, longitudinally, laterally, in rotation or in a combination thereof while submersed in the liquid LQ.

Therefore, the liquid LQ that the liquid reservoir 73 holds performs the function of a lid that covers the portion that corresponds to the entrance to the gap 90 when viewed from the exterior of the apparatus, thus sealing off the interior of the apparatus from the exterior so as to prevent the entry of mist, dust and other such foreign matter into the interior of the apparatus.

Moreover, because the liquid LQ covers the entrance by which foreign matter might get inside the apparatus, the gap 90 can be comparatively broad without adversely affecting the ability of the structure to prevent the entry of foreign matter. The same holds true for the gap between the inner wall part 71 and the downwardly pendant part 83, which need not be made particularly narrow. In addition, the precision with which both members 70, 80 (or the parts that form these members) are required to be formed may be reduced, and the requirement that they be assembled with precision may be relaxed as well.

As a result, the waterproof/dustproof structure of the invention provides advantages both in terms of the cost of manufacturing the members or the parts and in the number of steps required for assembly. It should be noted that, in the present example, since a part of the downwardly pendant part 83 of the rotary shaft member 50 floatingly moves while immersed in the liquid LQ, it is easier for waves to be generated within the liquid LQ than is the case with the example illustrated in FIGS. 3A and 3B. Nevertheless, it remains true that there is no fixed contact between the stationary member 70 and the movable member 80 so long as there is no substantial movement such as that generated were they to come into direct contact with each other. Accordingly, the smooth movement of the movable member 80 is not greatly hindered. Direct contact between the stationary member 70 and the movable member 80 can be avoided by giving the gap 90 and the gap between the inner wall part 71 and the downwardly pendant part 83 sufficient breadth and the liquid reservoir 73 sufficient depth.

It should be noted that, as described above, in the examples illustrated in FIGS. 3A and 3B as well as in FIGS. 4A and 4B, or in other examples, for the liquid LQ used in the waterproof/dustproof structure of the invention, if the movable member (for example, the rotary shaft member 50 shown in FIGS. 3A and 3B and the movable member 80 shown in FIGS. 4A and 4B) is supported by a hydraulic bearing that uses a liquid as its working fluid, that working fluid can be used. In that case, fluid bled from the hydraulic bearing may be led to the liquid reservoir (for example, the liquid reservoir 43 shown in FIGS. 3A and 3B and the liquid reservoir 73 shown in FIGS. 4A and 4B). In addition, if the apparatus is a machine tool, all or part of the machining fluid used in processing, such as cutting, grinding, and so forth, may be introduced as the liquid LQ. It goes without saying that, where the waterproof/dustproof structure of the present invention is adapted to a variety of movable mechanisms, it is configured so that, if there is an overflow of the liquid LQ from the liquid reservoir caused by a rise in the surface of the liquid LQ or ripples in the surface of the liquid LQ, that overflow does not reach the interior of the apparatus. Incidentally, as shown in any of the examples shown in FIGS. 2 through 4B, the height of the inner wall of the liquid reservoir is sufficiently greater than that of the outer wall, and therefore no liquid LQ spills into the interior of the apparatus even if liquid LQ overflows to the outside of the apparatus.

What is claimed is:

1. A waterproof/dustproof structure for a boundary between an interior and an exterior of an apparatus, comprising:
   a stationary member;
   a movable member that rotates relative to said stationary member without contact with said stationary member forming a gap region in between to define the boundary between the interior and the exterior of the apparatus; and
   a liquid reservoir containing liquid in the gap region to shield the interior of the apparatus from the exterior.

2. A waterproof/dustproof structure according to claim 1, wherein said movable member is supported by a hydraulic bearing, and hydraulic fluid of the hydraulic bearing is utilized as the liquid.

3. A waterproof/dustproof structure according to claim 1, wherein the apparatus comprises a machine tool and machining fluid used in the machine tool is utilized as the liquid.

* * * * *